Dec. 24, 1957 W. G. HENDERSON 2,817,746
STUD WELDER
Filed Aug. 29, 1955 2 Sheets-Sheet 1
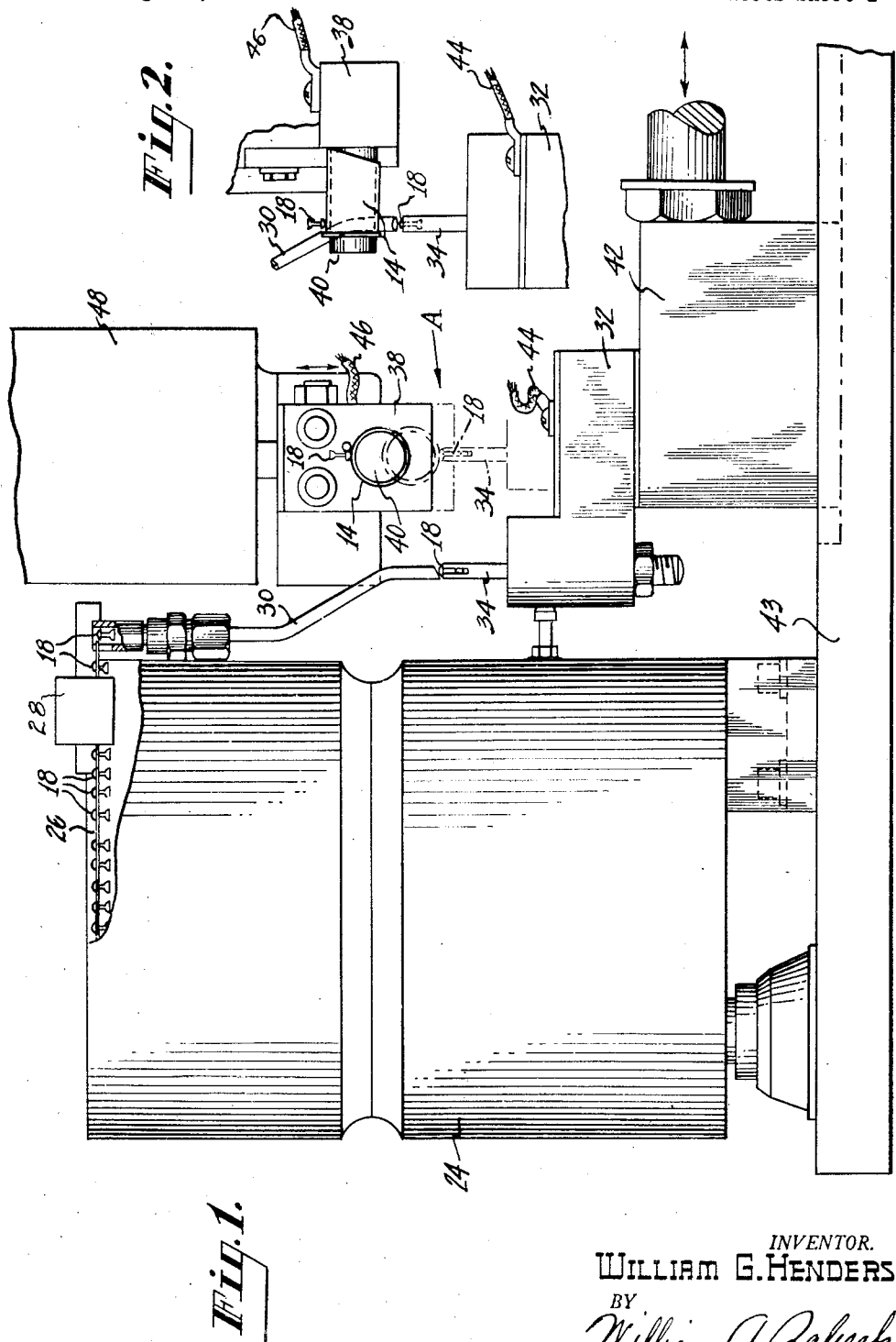
INVENTOR.
WILLIAM G. HENDERSON
BY
William A. Zaliwake
ATTORNEY Dec. 24, 1957 W. G. HENDERSON 2,817,746
STUD WELDER
Filed Aug. 29, 1955 2 Sheets-Sheet 2

INVENTOR.
WILLIAM G HENDERSON
BY
William A. Zalesak
ATTORNEY

United States Patent Office 2,817,746
Patented Dec. 24, 1957

2,817,746
STUD WELDER

William G. Henderson, Lancaster, Pa., assignor to Radio Corporation of America, a corporation of Delaware Application August 29, 1955, Serial No. 531,059

6 Claims. (Cl. 219—103)

This invention is directed to welding apparatus and specifically to a stud welder used in fabricating cathode ray tube gun parts.

The electron gun of a cathode ray tube normally consists of a plurality of tubular electrodes mounted in axial alignment with the tube envelope. The alignment of the gun parts is maintained by means of glass rod spacer elements fixed to each of the gun electrodes to hold them in rigid alignment. To each electrode there are welded short metallic studs projecting outwardly from the electrode. The alignment of electrodes is such that the studs of all the electrodes are positioned in line so that they make contact with a common glass support rod. Two or more support rods with associated studs may be used for forming a rigid gun assembly or mount structure.

The studs are fixed to the glass rods by being forced into the rod while the rod is in a softened condition at an elevated temperature. As the stud is forced into the glass of the rod, the glass closes around the stud and mechanically locks it within the glass. To provide a positive locking within the glass, each stud is formed with a wedge-shaped or flattened end, around which the softened glass hardens to lock the stud to the glass rod. In utilizing such a method of electrode mounting, it is necessary that all the studs fixed to any one glass rod are themselves aligned so that the wedge-shaped or flattened ends of the studs lie in a common plane. This requires that the stud be properly oriented before being welded to the respective gun electrode. It has been the practice to provide an orienting slot in the welder so that the stud is welded in the proper position to the electrode. However, the loading of the welder has been done by hand, which has been a time consuming operation.

Accordingly, it is an object of this invention to provide a stud welder having an improved stud loading mechanism.

It is another object of the invention to provide a stud welder having automatic means for loading.

It is a further object of the invention to provide a novel stud welding mechanism which may be loaded rapidly and accurately.

The invention is to an automatic loading mechanism for feeding studs with a pre-determined orientation into the welding electrode of a stud welding machine. The device includes a commercial vibratory parts feeder, which feeds the studs individually to a down-chute. This carries the studs to the welder electrode. The vibratory unit sorts the studs so that they fall through the chute always with the head portion upwardly. A gating mechanism is used to drop the studs, one at a time, into the down chute. The welder electrode is provided with a slotted aperture so as to receive a flattened wedge-shape end of the stud. In order that the stud be properly fed into the slot of the welder electrode the down-chute is rigidly fixed to the vibratory parts feeder so that vibrations from the feeder cause the stud to oscillate on the top of the electrode until it reaches its proper orientation, at which point it drops into the shaped electrode aperture for welding.

Figure 1 is a stud welding machine in accordance with the invention;

Figure 2 is a partial view of the stud welding machine of Figure 1 looking at the machine of Figure 1 in the direction A, indicated by the arrow;

Cathode ray tubes normally utilize a plurality of tubular electrodes mounted in spaced relation along a common axis for accelerating and focusing electrons to provide an electron beam. The electron beam is normally scanned over a target surface, such as a luminescent screen or other type of target, to provide any desired trace.

Figure 6:
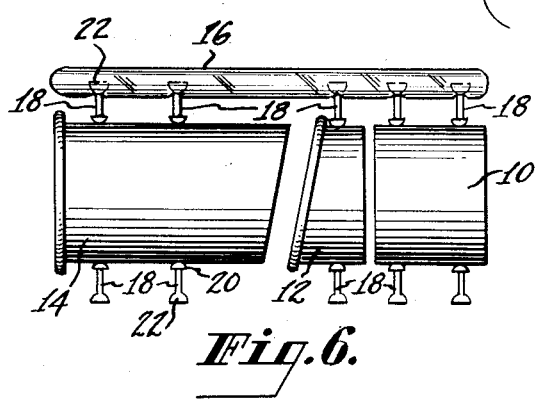
Figure 6 is an enlarged view of a parts gun structure for a cathode ray tube.

A method of mounting the gun electrodes is by utilizing glass spacer rods to which the electrodes are rigidly fixed in the desired alignment and spacing. Such an assembly of electrodes is shown in Figure 6, which discloses three tubular electrode structures, which are used in an electron gun for a cathode ray tube for television. The assembly comprises electrodes 10, 12 and 14 rigidly mounted to a glass rod 16. The electrodes may be portions of cylinders shaped in any desired manner. The electrodes are each joined to the glass rod by a plurality of studs 18 each respectively welded to the electrodes at one end of the stud and fixed to the glass rods at the other end.

Figure 3:
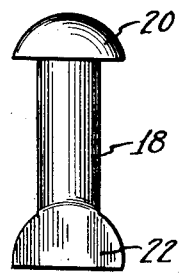
Figure 3 is an enlarged view of a stud construction used in the gun structure of Figure 1.
Figure 4:
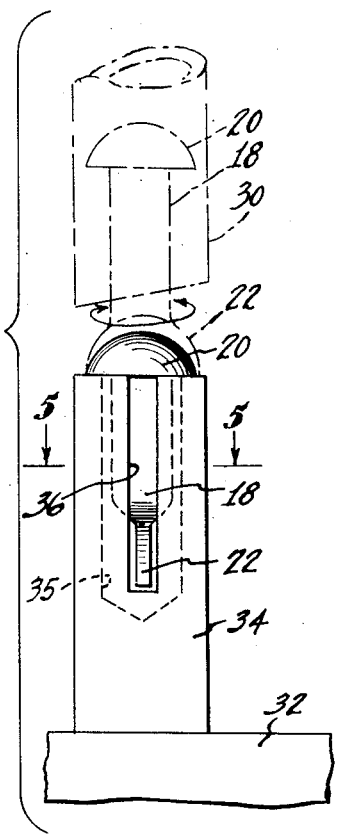
Figure 4 is an enlarged view of the automatic stud feeding mechanism used in the machine of Figure 3.
Figure 5:
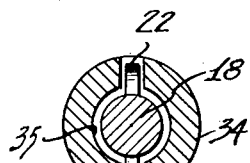
Figure 5 is a sectional view along section lines 5—5 of Figure 4.

Figure 3 shows an enlarged view of a mounting stud 18, which includes a mounted head portion 20 at one end and a flattened wedge-shape portion 22 at the other end. Other views of stud 18 appear in Figures 4 and 5.

As shown in Figure 6 the studs 18 are joined to the metallic electrodes 10, 12 and 14 respectively by welding the rounded head 20 of each stud to the outer wall of the electrode so that the studs project outwardly and substantially normal to the axis of the cylindrical electrodes. The electrodes then are mounted in a jig or mandrel (not shown) so as to hold them aligned along a common axis and with a predetermined spacing between the electrodes. Also the studs 18, which are to be fixed to the same glass rod 16, are held in alignment in a common plane by the supporting mandrel. This may be done with truly cylindrical electrodes, such as shown in Figure 6, by rotating the electrode about its axis before it is clamped firmly by the mandrel. If, however, the electrode is unsymmetrical, such as electrodes 12 and 14, studs 18 should be welded thereto in the proper position for alignment.

The glass rod 16 is then heated to a temperature at which the glass is softened. The mandrel with the electrodes 10, 12 and 14 is positioned over the glass rod and the aligned studs are forced into the softened glass until the glass closes over the flat wedge-shape ends 22 of the studs to mechanically lock the studs to the glass rod. This method of mounting electrodes to a common glass bead is set forth more fully in U. S. Patent 2,266,773 to R. R. Law.

To provide optimum strength in the mount structure of Figure 6, it has been found desirable that the studs 18 be welded to the electrodes 10, 12 and 14 so that the wedge-shape ends 22 of the studs all lie substantially in a common plane, which also includes the common axis of the several electrodes, as well as the axis of rod 16. Since the wedge-shape end 22 of each stud cuts into the glass rod 16, the wedge of the stud would unduly weaken the glass rod if it were forced into the rod at an angle to cut across the rod.

Figures 1 and 2 disclose a stud welding machine for welding studs 18 to tubular electrode portions with the proper orientation. The studs to be used are placed into a vibratory parts feeder 24 and are fed onto a track arrangement 26 so that the head portions 20 of the studs are held between two rails of the track with the wedge-shape ends 22 of the studs hanging downwardly. The details of the parts feeder 24 do not constitute any part of this invention and accordingly are not described. It is sufficient for the understanding of the invention to appreciate that the parts feeder 24, during operation, utilizes vibratory action whereby the studs 18 are fed onto track 26 and oriented with their mounted heads 20 upwardly. The studs 18 are pushed along the track 26 through a gating mechanism 28, which feeds the studs one at a time into a down-chute 30 through which they fall always head upwardly.

A welding machine 48 is provided for welding studs 18 to the respective gun electrodes. A first welding electrode 32 is provided with a stud support portion 34 positioned beneath the down-chute 30. As shown in the enlarged drawings of Figures 4 and 5, support 34 is drilled at 35 to receive the body portion of a stud 18 and also is provided with an alignment slot 36 to receive the wedge-shape portion 22 of each stud. Welder 48 also includes a second electrode 38 consisting of a cylindrical projection 40 designed to receive and support cylindrical electrode structures such as electrode 14 shown in Figures 1 and 2, for example.

Welder electrode 32 is slidably mounted on a supporting slide 42 and is adapted for horizontal sliding movement on a supporting base 43 and in the direction indicated by the double headed arrow in Figure 1. Thus, the stud support 34 can be alternately pushed under the down-chute position shown in solid lines of Figure 1, as well as into a position directly beneath the second electrode support 40 as shown in phantom lines in Figure 1.

The second welding electrode 38 is also mounted on a slide so as to be movable into a welding position along a vertical line downwardly toward the first electrode support member 34, when positioned beneath it. Adjustments are provided such that when a stud 18 is placed within the electrode support 34 and an electrode member 14, for example, is held by the second electrode support 40, contact is made between the head 20 of stud 18 and the adjacent wall of electrode 14 when the electrodes 34 and 40 are advanced to their welding positions shown in phantom in Figure 1. Appropriate currents are supplied to the welding electrodes 32 and 38 by lead means 44 and 46 respectively, which in turn are connected appropriately to the welding circuits of welder 48.

Due to the position of the alignment slot 36 in the welder electrode 34, the stud 18 is welded to the electrode 14 with the flat wedge-shaped end 22 aligned parallel to the axis of the tubular electrode 14. It is thus necessary that the individual studs 18, which are fed through the down-chute 30 onto the electrode support 34 be properly positioned so that the wedge-shaped end 22 of each stud will fall into the alignment slot 36 of the electrode support 34. It has been necessary to load the electrode support 34 by hand in which the operator individually selects a stud 18 and inserts it into the electrode 34 with the wedge-shaped end 22 of the stud in slot 36 before the welding operation can be performed. This has involved considerable delay in the welding process.

In accordance with the invention, therefore, the down-chute 30 is rigidly attached to a vibrating device to provide a very rapid vibration to the down-chute 30 and relative to the fixed electrode support member 34. A stud 18 falling through chute 30 has no particular orientation except that the head 20 is upwardly. The wedge-shaped end 22 of the stud will strike the top of the electrode support 34 and, unless the wedge portion 22 is accidentally aligned with slot 36, the stud will not enter into the support member 34. However, because of the relative movement between the vibrating chute 30 and the fixed support member 34, the stud 18 will rapidly turn or spin around its longitudinal axis until the wedge-shaped end 22 becomes aligned with the slot 36 at which point the stud 18 falls into the electrode support 34. The rotational spin of stud 18 is very rapid so that no delay occurs in feeding the stud into the slotted electrode support 34. The utilization of a vibration technique for feeding the studs into the slotted support 34 has eliminated the delay previously experienced in feeding studs into the welding electrode 34 by hand. The time saved has been considerable and has enabled a great increase in the output of the stud welding machine.

The vibration of the down-chute 30 is provided by rigidly attaching the chute to the vibrator 24. This expedient has proved satisfactory, but need not be limit-in gas any type of vibrating mechanism may be utilized to provide the required vibrating frequency to the chute 30. The commercial vibratory parts feeder 24, which has been successfully used, is one which has a frequency vibration in the order of 3600 per minute. However, the frequency of vibration is not critical nor is the amplitude of vibration of any great significance. It is only necessary that the vibration frequency be sufficiently rapid and of sufficient amplitude to cause the stud 18 to rotate rapidly about its longitudinal axis. This, of course, is determined by the dimensions of stud 18.

What is claimed is:

1. An apparatus for automatically loading an element having a shaped portion into a support member having an aperture for receiving only the shaped portion of said member, said apparatus comprising, a support member having a part thereof for receiving only the shaped portion of said member, a chute mounted above said support member and aligned with said aperture, a vibrating mechanism attached to said chute for providing vibratory motion relative to said support member.

2. An apparatus for automatically loading an element having a differently shaped portion into a support member having an aperture for receiving only the differently shaped portion of said member, said apparatus comprising, a support member having a recess for receiving said element, said recess including a part at the opening thereof formed differently than the remainder of said recess to receive only the differently shaped portion of said member, a chute mounted above said support member and aligned with said aperture, a vibrating mechanism attached to said chute for providing vibratory motion relative to said support member whereby an element in said chute is rotated until the shaped portion thereof drops into said recessed part.

3. An apparatus for automatically loading a rod shaped element having a differently shaped end into a support member having an aperture for receiving only the differently shaped end of said element, said apparatus comprising a support member having a recess for receiving said rod shaped element, said recess including at the opening thereof a shaped aperture formed differently than the remainder of said recess to receive only the differently shaped end of said element, a chute mounted above said support member and vertically aligned with said aperture, a vibrating mechanism attached to said chute for providing vibratory motion relative to said support member whereby a rod shaped element in said chute is rotated about its axis until the shaped end thereof drops into said shaped aperture.

4. An apparatus for automatically loading studs having wedge-shaped ends into a support member having a slot for receiving only the wedge-shaped end, said apparatus comprising a support member having a recess therein for receiving said stud, said recess including a slotted aperture designed to receive only the wedge-shaped end of said stud, a chute member mounted above said support member and aligned with the recess of said support member, a vibrating mechanism attached to said chute member providing a vibratory motion relative to said support member.

5. A welding apparatus comprising a first electrode member having a recess therein for receiving a rod-shaped stud having a differently shaped end, said recess including an aperture at the opening of said recess and formed differently than the rest of said recess to conform only with the shaped end of said stud, a chute mounted above said support member and vertically aligned with said aperture, a vibrating mechanism attached to said chute for providing vibratory motion relative to said support member, a second electrode member spaced from said chute for holding an element to be welded to said stud, and means movably mounting said first and second electrode members for movement relative to each other to bring said stud into welding contact with said element.

6. A welding apparatus comprising a first electrode member having a recess therein for receiving a stud having a wedge-shaped end, said recess including a slotted aperture formed to receive only the wedge-shaped end of said stud, a chute mounted above said support member and aligned with the recess of said first electrode member, a vibrating mechanism attached to said chute for providing vibratory motion relative to said first electrode member to align the wedge-shaped end of said stud with said slotted aperture, a second electrode member spaced from said first electrode member and including means for supporting a tubular member to be welded to said stud, means movably mounting said first electrode member for movement relative to said second electrode member, said first electrode mounting means including structure to align said first electrode member with said tubular member support means whereby said slotted aperture will be in substantially the same plane as the axis of said tubular member.

References Cited in the file of this patent

UNITED STATES PATENTS

| | | |
|---|---|---|
| 280,404 | Root | July 3, 1883 |
| 1,999,617 | Randall | Apr. 30, 1935 |
| 2,103,206 | Ober | Dec. 21, 1937 |
| 2,442,426 | Metcalf | June 1, 1948 |
| 2,696,285 | Zenlea | Dec. 7, 1954 |